(12) United States Patent
Gabryjelski

(10) Patent No.: US 7,068,575 B2
(45) Date of Patent: Jun. 27, 2006

(54) HIGH SPEED OPTICAL DISC RECORDING

(75) Inventor: Henry P. Gabryjelski, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 554 days.

(21) Appl. No.: 10/631,162

(22) Filed: Jul. 30, 2003

(65) Prior Publication Data

US 2005/0025011 A1 Feb. 3, 2005

(51) Int. Cl.
G11B 7/00 (2006.01)

(52) U.S. Cl. .................................... 369/47.33
(58) Field of Classification Search ............. 369/47.33, 369/47.34, 47.32, 47.1
See application file for complete search history.

(56) References Cited

U.S. PATENT DOCUMENTS 6,081,264 A      6/2000   Rosen et al. ................. 345/328
6,967,910 B1 *  11/2005   Yamamoto ............... 369/47.11

OTHER PUBLICATIONS

Bennett, Hugh; "Smart and Friendly's CD Rocket Mach 12"; *EMedia*; Apr. 2000; vol. 13, No. 4; p. 62-4.

Nathans, Stephen F.; "Microboards' 8X Copywriter A2D"; *EMedia Professional*; Jul. 1999; vol. 12, No. 7; p. 63-4.

Bennett, Hugh; "Hewlett-Packard Surestore CD-Writer 4020I: CD-R for the Mainstream Buyer?"; *CD-ROM Professional*; Jan. 1996; vol. 9, No. 1; p. 78-80, 82, 84-6, 88, 90-2.

Parker, Dana J.; "CD-R on the Safe Side: Seven Rules of Successful CD Recording"; *EMedia Professional*; Apr. 1997; vol. 10, No. 4; p. 71-2, 74-8, 80-1.

* cited by examiner

Primary Examiner—Nabil Hindi
(74) Attorney, Agent, or Firm—Workman Nydegger

(57) ABSTRACT

The present invention prevents data underruns within an internal buffer of an optical media recording device while improving a recording rate by dynamically determining a time period to delay transferring data from a computer system to an optical media recording device. The time delay period may be set when an indication to delay data transfer from a source to an optical media recorder is received because the internal buffer is unable to hold or to receive additional data. The time delay period may then be set to a time less than a total time to empty the internal buffer given the total capacity of the internal buffer and the data transfer rate of the optical media recording device. Other factors also may be considered, such as the size and time for a single write to the optical media recorder.

32 Claims, 6 Drawing Sheets

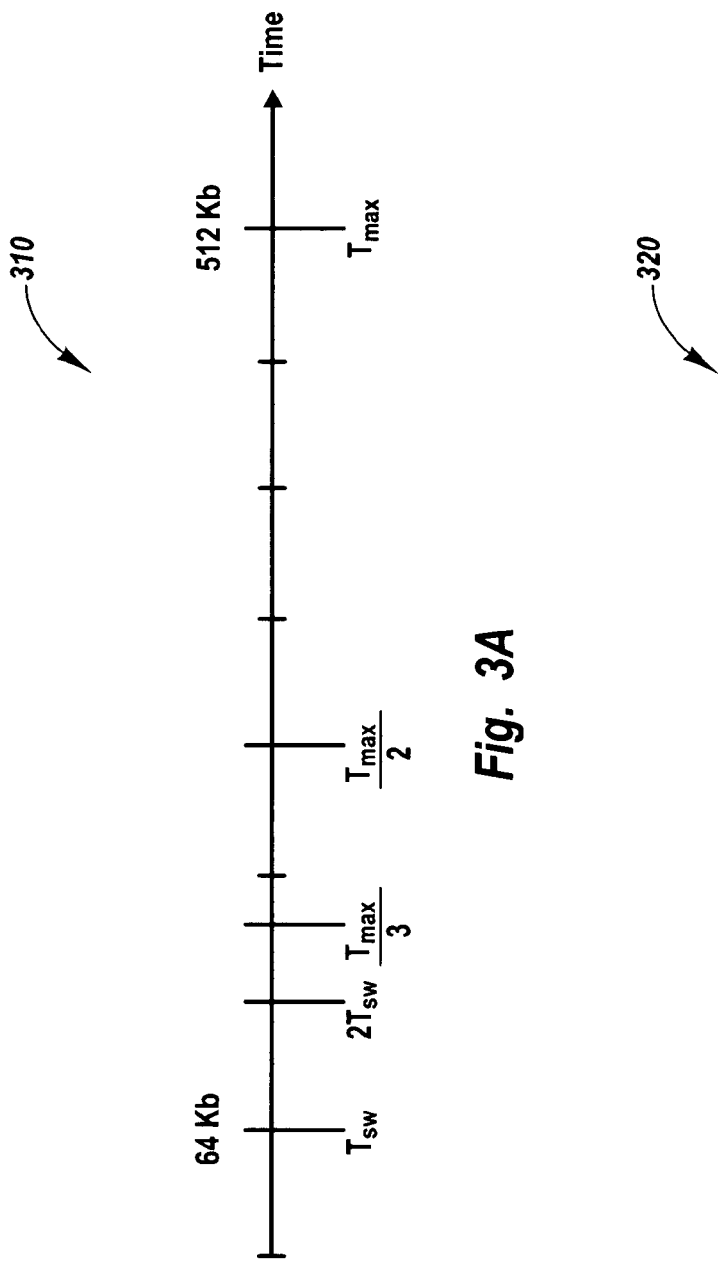

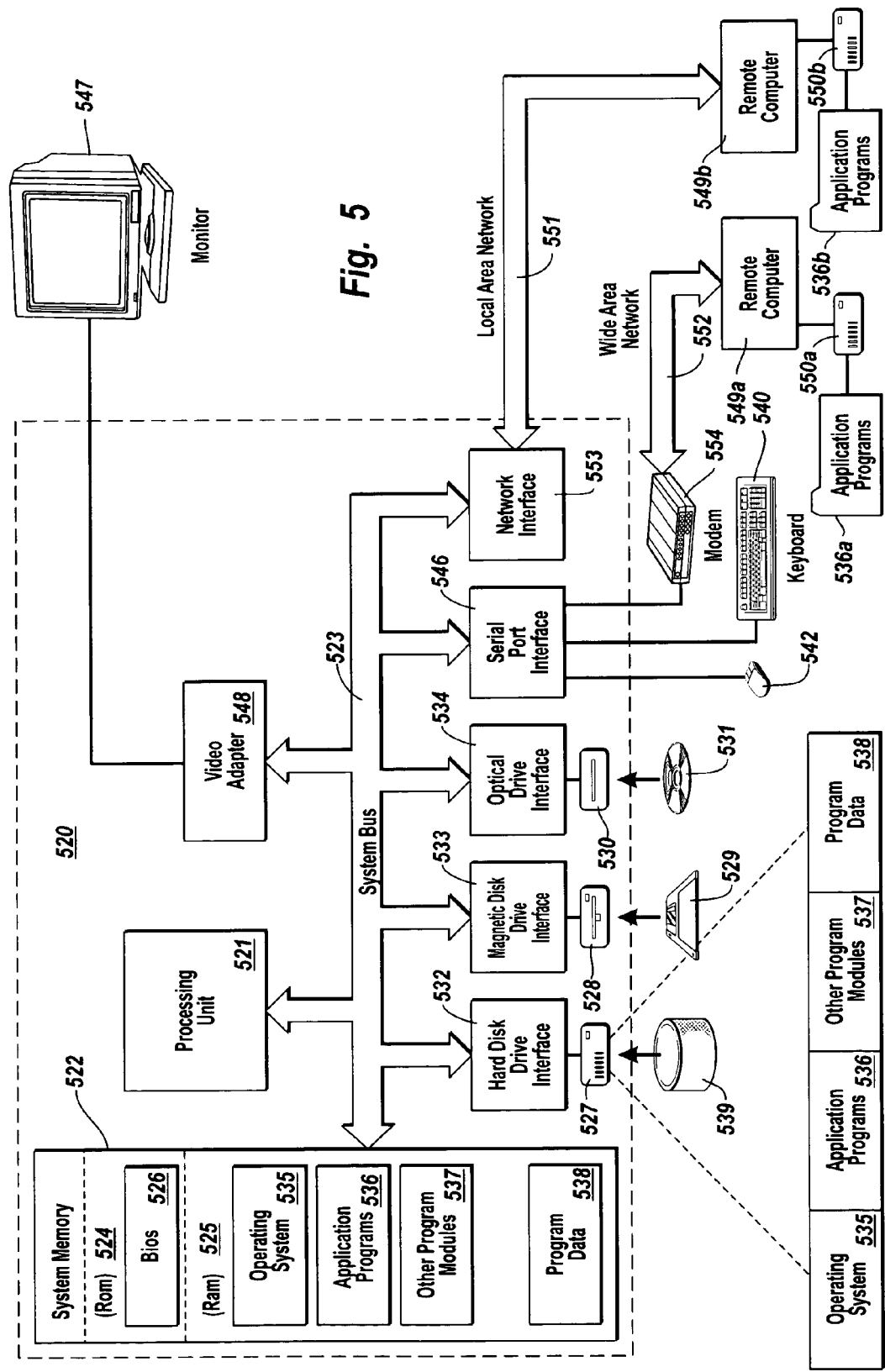

HIGH SPEED OPTICAL DISC RECORDING

CROSS-REFERENCE TO RELATED APPLICATIONS

N/A

BACKGROUND OF THE INVENTION

1. The Field of the Invention

The present invention generally relates to optical media recording systems. More particularly, the present invention provides systems, methods and computer program products for improving high speed optical media recording rates by dynamically calculating a time delay in transferring data from a computer system to an optical media drive in order to prevent buffer underrun.

2. Background and Relevant Art

Optical media recorders have opened a new world of information sharing. In contrast to similarly sized magnetic media, optical media allows for the storage of significantly more data in the same space. Optical discs can be used to store any type of digital information, including images, audio, application programs and data, web pages, video, etc. Although initially quite expensive and complex, optical media recorders and discs have become increasingly affordable and easier to use. It is now possible for a typical user to record optical discs that can be read by most any compact disc (CD) player, Digital Video Disc (DVD) player, or other optical drive/player.

In spite of technological improvements with optical media recorders, some performance problems remain. For example, one of the most common performance problems in recording to an optical disc is known as buffer-underrun. When recording to optical media it is important that the flow of data streaming to the optical media recorder be relatively constant. Optical media recorders generally have an internal memory buffer to compensate for small gaps or delays in transferring data; however, if the data flow is interrupted for too long, the optical media recorder will run out of data. As described in more detail below, at best buffer underruns lead to poor performance. For example, depending on the type of data being recorded and the sophistication of the optical media recorder, a buffer underrun may cause gaps or noise in the recording and lead to slow recording speeds. In many cases, however, a buffer underrun ruins the disc being written.

One optical media recorder technique to account for buffer underruns (without ruining the disc being written) includes the optical media recorder constantly checking or monitoring the status of the optical media recorder's internal buffer. When an impending buffer-underrun condition is detected (e.g., the buffer falls below a certain threshold of its maximum capacity) recording is stopped in a controlled fashion at a specific location. Then, when the buffer has been sufficiently replenished, recording resumes at the specific location. However, stopping the drive, waiting for the buffer to fill, spinning the drive back up, resynching, and restarting the write delays the recording process, particularly if it occurs multiple times in recording a single disc. Furthermore, this technique leads to a small gap in the recorded data. While this gap is small enough for most drives to be able to automatically recover from, some drives (especially consumer audio CD players) are unable to smoothly handle this gap, resulting in undesirable "pops" or "clicks" in the final audio heard or corrupted data.

Some delays in transferring data to an optical media recorder are normal and to be expected. For example, when the optical media recorder's internal buffer is full, there is no need to send or attempt to send additional data to the optical media recorder. In many computer systems, resources can be put to other productive uses for some period of time. Traditionally, this time period has been hard coded, typically ranging from about 100 to 250 ms, and has not accounted for a variety of factors, such as recording speed, buffer size, the size of an individual write, etc. For a time, the hardcoded delay was not much of a problem because most recorders had similar performance characteristics.

With recent advances in optical media recording technology, however, optical media recorders vary substantially in performance, most notably in recording speed. In spite of these technology advances, the hardcoded delay remains. As optical media recording performance continues to improve, the effects of a hardcoded delay are likely to be more noticeable, with buffer underruns becoming more common and therefore limiting the quality and speed of optical recordings with greater frequency.

As indicated above, traditional hardcoded delays simply fail to account for individual characteristics of a given optical media recorder, such as recording speed, buffer size, the size of an individual write, and so on. Accordingly, as these factors vary, from one device to another, or perhaps even within the same device (e.g., recording speed often vary based on the optical media being used), there has been no corresponding change in the delay time period. For example, as optical media recorders increase in writing speed, the entire internal buffer may be emptied within the fixed time delay period, causing a buffer underrun. As a result, the full performance potential, both in terms of quality and speed, of the optical media recorder is undermined and cannot be achieved.

An alternative technique to the fixed or hardcoded time delay period uses a percentage full calculation and a user-specified threshold for the internal buffer. The percentage full calculation and threshold are used to refill the internal buffer when a selected percentage of the buffer's total capacity has been emptied. This solution, however, also has several significant shortcomings. First, there is a significant performance cost associated with the overhead of continuously checking the buffer to determine when the buffer has been depleted below a certain percentage. To account for this overhead, the priority of the process checking and writing to the buffer may need to be adjusted to receive more processing time, which reduces the processing resources that are available to other tasks. Furthermore, it should be noted that the relationship between a buffer, a percentage of the buffer's capacity, process priority, and the processing load from other concurrently running tasks is fairly sophisticated and is likely beyond the expertise of most users.

The percentage full technique also fails to account for the differing record rates for different media. For example, typically the record rate for a CD-R disc is greater than the record rate for a CD-RW disc. As a result, a depletion percentage that may be optimal for CD-RW media may be inadequate for CD-R media, and a percentage that may be optimal for CD-R media may be wasteful for CD-RW media.

Accordingly, there exists a need for improving high speed optical media recording rates by dynamically calculating a time delay in transferring data to an optical media recorder in order to prevent underruning the optical media recorder's internal buffer.

BRIEF SUMMARY OF THE INVENTION

In accordance with example embodiments of the present invention, the above-identified deficiencies and drawbacks of current optical media recorders are overcome. For example, embodiments provide for a computer program product and method for preventing data underruns within an internal buffer of an optical media recording device while improving or optimizing a recording rate by dynamically determining a time period to delay transferring data to the optical media recording device when the internal buffer is unable to receive additional data.

The computer program product and method provide for receiving an indication to delay data transfer from the computer system to the optical media recording device because the internal buffer is unable to hold or receive additional data. Received data transfer rate information is used to determine a data transfer rate of the optical media recording device and received size information is used to determine a total capacity of the internal buffer. A time delay period can then be set to a time less than a total time to empty the internal buffer given the total capacity of the internal buffer and the data transfer rate of the optical media recording device so that data may be sent to the optical media recording device immediately following the time delay In accordance with another example embodiment, a computer program product and method prevent data underruns within an optical media recording device's internal buffer, while optimizing a recording rate by waiting a dynamically selected time period to delay data transfer from a computer to the optical media recording device. A computer system temporarily stop data transfer from the computer system to the optical media recording device because the internal buffer is unable to receive additional data. A data transfer rate of the optical media recording device and a capacity of the internal buffer are determined. The computer system waits a time delay period dynamically selected to be less than a total time to empty the internal buffer based on the capacity of the internal buffer and the data transfer rate of the optical media recording device. Accordingly, data transferred from the computer system to the optical media recording device may be resumed prior to the total time to empty the buffer.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 3A–3B illustrate charts of various time delay periods in accordance with example embodiments;

FIG. 5 illustrates an example system that provides a suitable operating environment for the present invention.

DETAILED DESCRIPTION OF THE PREFERRED EMBODIMENTS

The present invention extends to methods, systems, and computer readable media for preventing buffer underruns in an optical media recording device while optimizing recording rates by dynamically determining appropriate data transfer delays. The embodiments of the present invention may comprise a special purpose or general-purpose computer including various computer hardware, as discussed in greater detail below.

Figure 1:
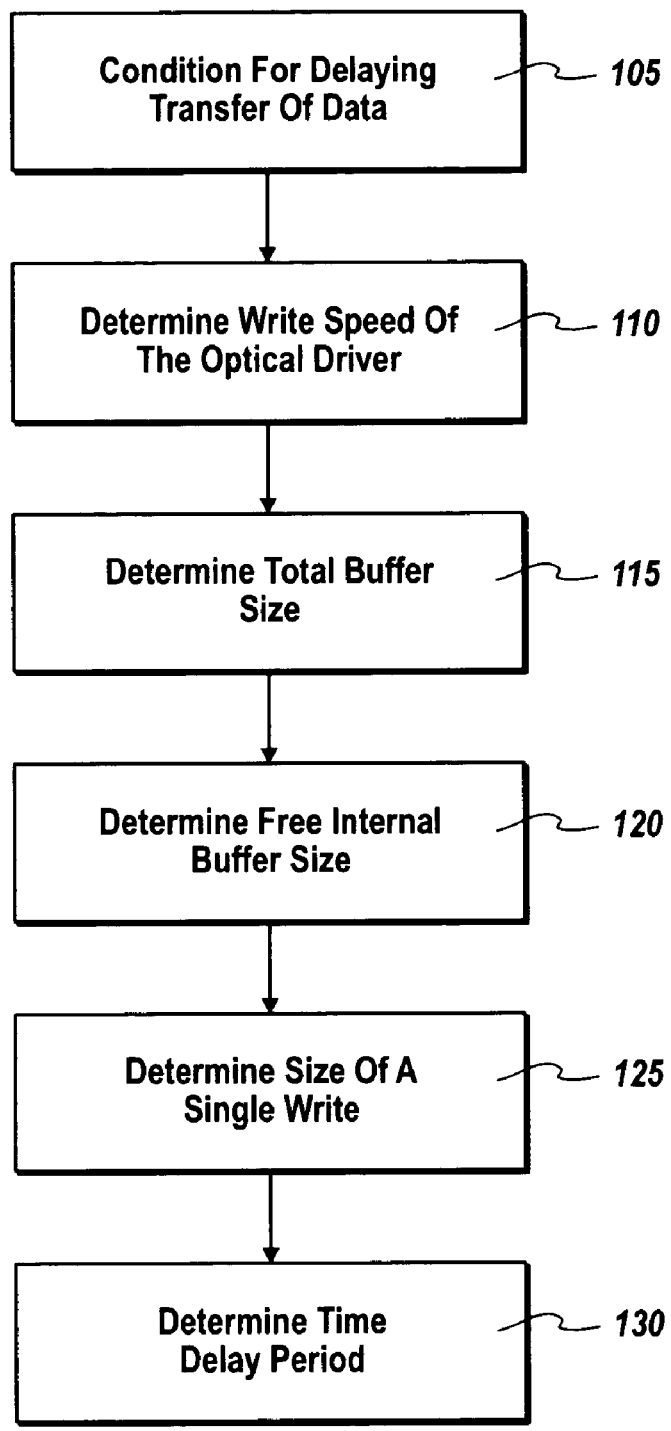
FIG. 1 illustrates example processing for dynamically determining a time period to delay data transfer from a computer source to an optical media recorder.

FIG. 1 shows example processing for determining a time period to delay data transfer from a computer source to an optical media recorder. Note that the ordering in FIG. 1 is merely one example of many possible orderings, and therefore FIG. 1 should not be interpreted as imposing any particular ordering on the present invention. A condition 105 for delaying the transfer of data from a computer system to an optical media drive initiates the process. This condition could be, e.g., a buffer error from a return sense code. These types of errors may indicate that the buffer is in the process of a long write or another operation is being performed, and therefore, the host or source of the data should delay transferring data to the optical media recorder because the device is not ready. Another example condition for delaying the transfer of data to the optical media recorder might be insufficient space in the optical media recorder's internal buffer. Delays also may be pre-calculated so that the optical media recorder receives data over predefined or regular intervals, in which case the condition may be simply waiting for the pre-calculated delays.

Several factors are determined for use in optimizing the time delay period before resuming data transfer. For example, the write speed 110 of the optical media device can be determined. The write speed is the rate at which data is transferred from the optical media recording device to the optical disc. It is important to note that unlike many hard disks, the data density on optical media may be the same across the disc. This means that there may be more data stored during a single revolution at the outer edge of the disc area than is stored at the inner edge of the disc. Accordingly, the write speed for optical media may vary depending on the rotational type of the optical drive and/or the radial distance at which the data is being recording.

Figure 2A:
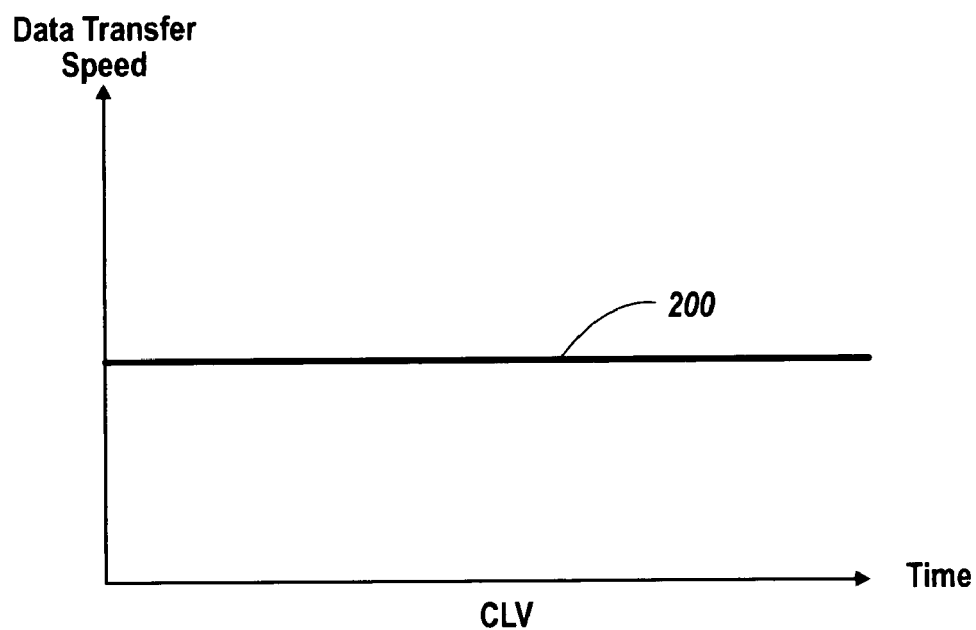
FIG. 2(a) illustrates one example data transfer rate known as constant linear velocity (CLV)
Figure 2B:
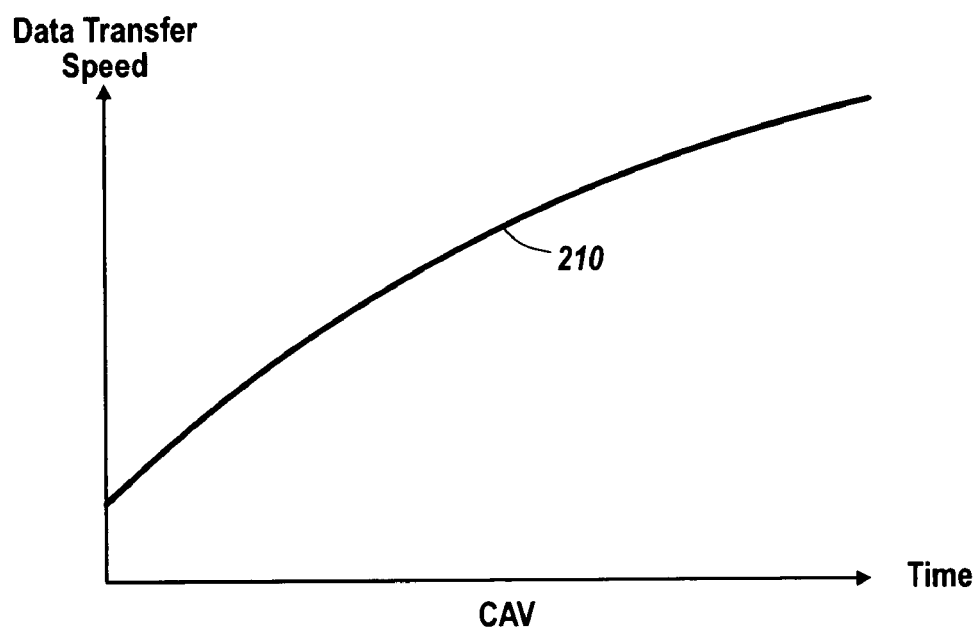
FIG. 2(b) illustrates another example data transfer rate known as constant angular velocity (CAV)
Figure 2C:
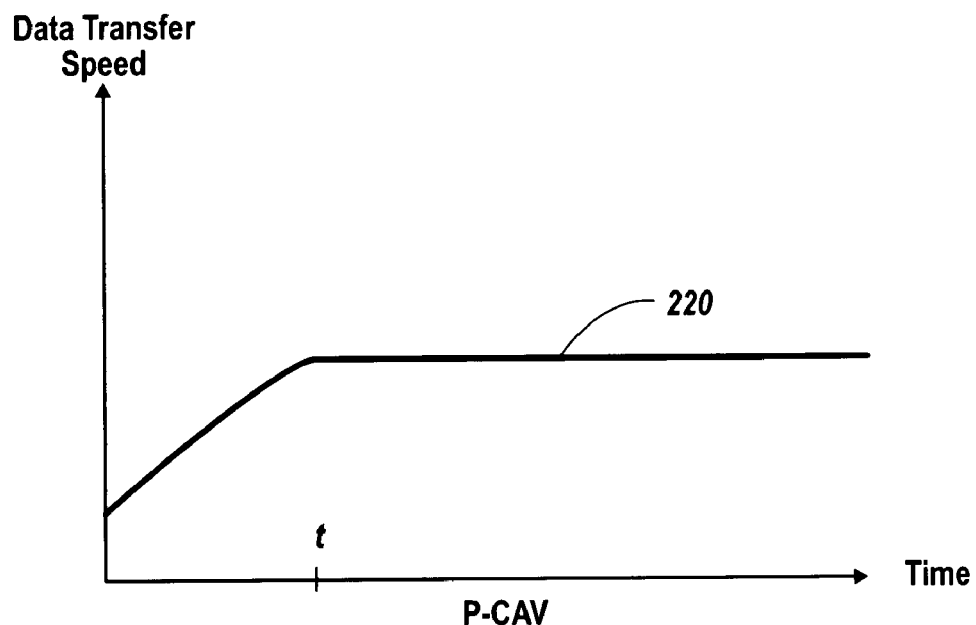
FIG. 2(c) illustrates yet another example data transfer rate known as partial constant angular velocity (P-CAV)
Figure 2D:
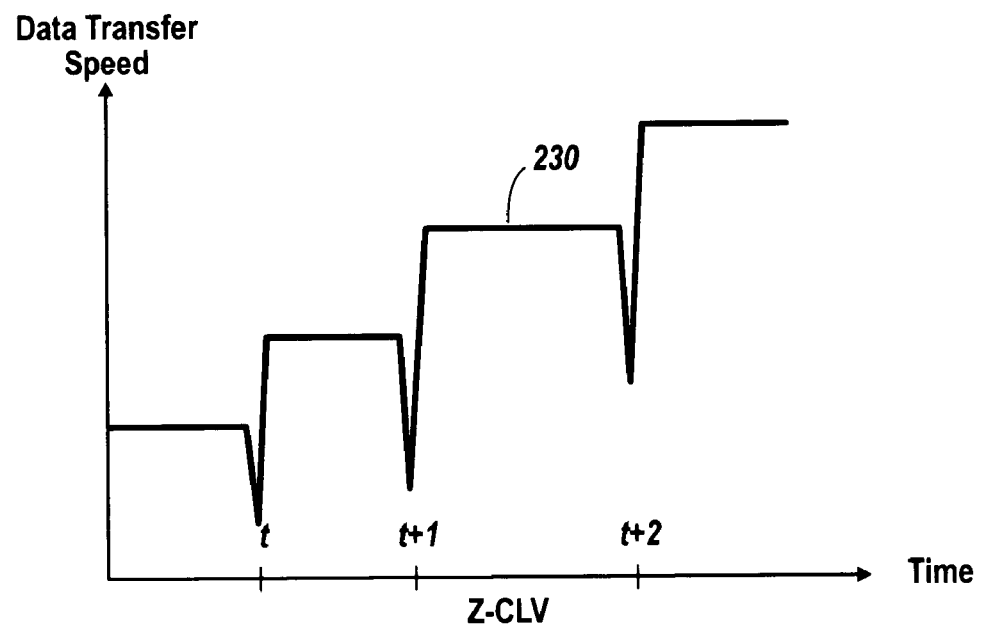
FIG. 2(d) illustrates a final example data transfer rate known as zoned constant linear velocity (Z-CLV)

FIG. 2(a) shows one example type of data transfer rate 200 known as constant linear velocity (CLV). For this type of data transfer, the data transfer rate 200 is kept at a constant level across the entire disc by changing the rotational speed based on the radial distance at which data is being written. FIG. 2(b) shows another example type of data transfer rate 210 known as constant angular velocity (CAV). The drive maintains a constant rotation speed with the resulting variable transfer rate 210 over time. FIG. 2(c) illustrates yet another example data transfer rate 220 known as partial constant angular velocity (P-CAV). P-CAV is a combination of CLV and CAV. The transfer rate 220 increases (CAV) until the drive reaches its maximum speed at time t. From that point on the transfer rate 220 will be constant over time (CLV). Because P-CAV drives reach their maximum speed much sooner than CAV drives, the average transfer rate is generally higher. Finally, FIG. 2(d) shows an example data transfer rate 230 known as zoned constant linear velocity (Z-CLV). As its name implies, Z-CLV involves several CLV zones. For example, from zero to t is a first CLV zone, from t to t+1 is a second CLV zone, from t+1 to t+2 is a third CLV zone, and so on.

In accordance with example embodiments of the present invention, the write speed 110 of a variable speed optical media drive can be determined from an instantaneous write speed at a starting point and an ending point of a given section of the optical media. The data transfer rate between these two instantaneous points can be presumed linear to simplify processing. As one of ordinary skill in the art would recognize, however, additional instantaneous sample points could be used in order to determine a write speed more with greater specificity.

Task 115 determines the total size for the internal buffer. This value is constant, and may be requested from the optical media recording device, from configuration information about the device, etc. Values of 256 kb, 512 kb and 1 mb are common. As will be discussed in greater detail below, this size of the internal buffer and the writing speed of the optical media recorder are used in determining a time delay period for transferring data from a source to the optical media recorder.

In task 120, an instantaneous amount of free internal buffer space is determined. This is an instantaneous amount, because the amount of data stored in the internal buffer changes constantly as buffer data is written out and new data is received.

Task 125 determines the size of a single write from the computer source to the optical media recording device or from the optical media recording device to the optical media. (Typically neither the optical media recording device nor the optical media itself are byte addressable and must be written to in blocks, such as 32 kb, 64 kb, or 128 kb blocks.) Depending on their relative size, either or both sizes, may be relevant. Accordingly, "single write size" and "size of a single write" should be interpreted broadly to encompass writes from the computer source to the optical media and/or writes from the optical media recording device to the optical media. Nevertheless, it is anticipated that most embodiments of the present invention will use the size of writes from the computer source to the optical media recording device as this size is more directly related to determining a time delay period.

For example, a delay period based on the size of a single write to the optical media recording device and the write speed of the optical media recording device assures that after the delay period an amount of data equal to the size of a single write may be transferred to the optical media recording device. Attempts to write more frequently generally will fail, but may be appropriate if it is desirable to keep the internal buffer as close as possible to 100% full. As described in more detail below, the time for a single write may be used alone or in combination with a variety of other factors.

One technique for determining the size of single write involves querying the adaptor for to the number of pages it can span, knowing that a single page boundary is typically 4 kilobytes. If the adaptor responds that a maximum page span is 17, a single write would be 64 kb (16 pages×4 kilobytes), assuming potential use of an extra page in some circumstances. For many optical media recording devices a single write is 64 kb, and therefore in accordance with an example embodiment, 64 kb is a default value. Nevertheless, because other values, such as 32 kb and 128 kb also are common, the present invention provides for determining the size of a single write.

In task 130, a time delay period is determined, which ensures that the internal buffer is ready to accept more data without risking a buffer underrun. For example, one embodiment provides for determining a maximum amount of time to wait or delay the transfer of data (such as when read buffer capacity indicates buffer is full) by taking the total size of the buffer and dividing it by the aforementioned write speed of the optical media recorder. If the write speed of the optical media recorder varies while writing our the full buffer, an average, weighted average, or some other modified version of the write speed may be used in the calculation. This is the time it takes to empty the buffer when the buffer is at maximum capacity. Any greater delay time will almost certainly result in a buffer underrun.

Of course, the time delay period may vary depending on the reason for delaying data transfer to the optical media recording device. For example, the time delay period for a full buffer may be greater than the time delay period when the optical media recording device is unable to receive addition data due to an ongoing operation. For example, this notification may be received if the drive has insufficient space at the current moment in time for a write buffer; Therefore, the full buffer may in actuality only be (buffersize−writesize+1) full. Several example time delay periods are described in greater detail below.

FIGS. 3A–3B are charts 310 and 320 that illustrates various time delay periods in accordance with example embodiments. In particular, the time it takes to empty an example 512 kb buffer that is completely full is shown as $T_{max}$. Selecting relatively longer time delay periods frees resources for other productive uses. One problem, however, with this maximum delay period is that when the buffer empties to a certain amount, such as one-third full, some drives will determine that a buffer underrun is imminent and stop writing until the internal buffer is replenished, resulting in poor drive performance in terms of quality and/or speed. To provide a margin of safety, a time delay period of $T_{max}/2$, as shown in chart 310 of FIG. 3A, or some other suitable percentage of $T_{max}$ may be used. For some optical media recording devices, the percentage may be determined by empirical studies and specified in configuration information for the device.

In another example embodiment of the present invention, waiting a time delay period $T_{sw}$ assures that a single write's worth of data, such as 64 kb as shown in chart 310 of FIG. 3A and 128 kb as shown in chart 320 of FIG. 3B, may be transferred to the optical media recorder. (Ordinarily the single write size will correspond to the minimum amount of data that may be transferred from the computer source to the optical media recording device, but may also correspond to the minimum amount of data that can be transferred from the optical media recording device to the optical media.) As described above, $T_{sw}$ may be determined by taking the size of a single write and dividing it by the write speed (which may vary) of the optical media recorder. In some embodiments, a multiple, such as $2T_{sw}$ may be used in determining the time delay period to allow for transferring more that a single write's worth of data to the optical media recorder before encountering another time delay period.

In accordance with yet another example embodiment of the present invention, the above margin of safety is padded even further by setting the maximum time delay period $T_{max}/3$ such that a maximum of about one-third of the buffer empties before data transfer from the source to the optical recording device is resumed. As indicated above, combinations of various delay time periods, such as those illustrated in FIGS. 3A–3B, also may be used. For example, as shown in FIG. 3B, if the delay time $2T_{sw}$ is greater than the delay time $T_{max}/3$, then $2T_{sw}$ could be used for the time delay period, whereas otherwise (e.g., in FIG. 3A $2T_{sw}$ is less than the delay time $T_{max}/3$) a time delay period of $T_{max}/3$ would be used. Accordingly at least two writes, but no more than the number to fill one third of the internal buffer, will occur successfully after the time delay period.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 4:
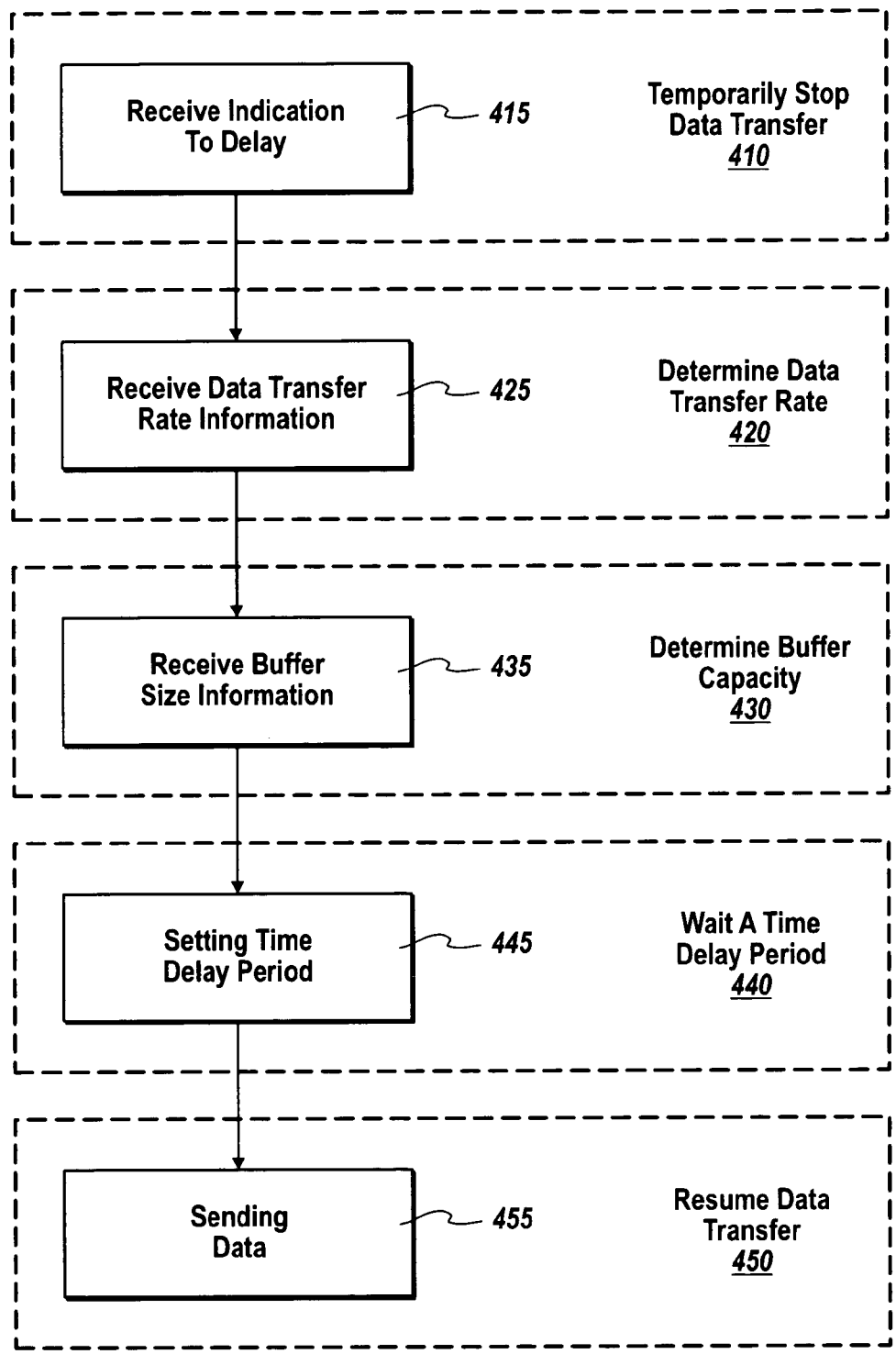
FIG. 4 illustrates example steps and acts used in preventing data underruns in accordance with example embodiments.

FIG. 4 illustrates example steps and acts for preventing data underruns within the internal buffer while optimizing a recording rate. A step for temporarily stopping (410) data transfer from the computer system to the optical media recording device may include an act of receiving (415) an indication to delay data transfer. As indicated above, the received indication and corresponding temporary stop in data transfer may result from the internal buffer being unable to hold or receive additional data. This may be due to a returned sense code, e.g., an indication that a long write or some other operation is in process, and therefore the optical media recording device is not ready to receive data. Alternatively, the indication to delay may be due to insufficient space in the optical media recording device's internal buffer.

A step for determining (420) a data transfer rate of the optical media device may include an act of receiving (425) data transfer rate information. As mentioned above, the data transfer rate may be dynamic or static in nature. If it is dynamic (that is, changes over time), the information provided may be an estimate, average, weighted average, etc., of the transfer rate for a particular portion of the optical media being written. The data transfer rate information might include an instantaneous indication or a starting and ending rate for a portion of the optical media. In some embodiments, the data transfer rate is assumed to change in a linear fashion between the received starting and ending rate.

A step for determining (430) a total capacity of the internal buffer may include an act of receiving (435) buffer size information. This information is used in determining the maximum time delay period, based on the optical media recording device's write speed, to empty the device's internal buffer. Any greater time delay period likely will lead to a buffer underrun.

A step for waiting (440) a time delay period dynamically selected to be less than a total time to empty the internal buffer may include an act of setting (445) the time delay period to be less than a total time to empty the internal buffer. As mentioned above, this maximum time delay period is based on the given total capacity of the internal buffer and the data transfer rate of the optical media recording device (which may vary). Example embodiments provide for a time delay period no larger than the time period required to empty one-third of the optical media recording device's internal buffer.

The step for waiting (440) the time delay period may include an act of receiving single write size information for determining a size of a single write from a computer system to the optical media recording device. Accordingly, the time delay period could be, e.g., a time period for the single write given the write size and data transfer rate. Alternatively, the time delay period could be set to the time period for two or more single writes. Another embodiment provides for choosing between the greater of a time period for two single writes and a time period for writing one-third the total capacity of the internal buffer.

Finally, a step for resuming (450) data transfer from the computer system to the optical media recording device prior to the total time to empty the internal buffer may include an act of sending (455) data from the computer system to the optical media recording device immediately following the time delay period. One example embodiment provides for no interim attempts at sending data prior to the expiration of the time delay period. Eliminating interim attempts reduces the overhead of continual attempts of transferring data from the source to the optical media device when the buffer is not ready to receive data. Other embodiments may allow for interim attempts in order to keep the internal buffer as close as possible to 100% full.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 5 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a general purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disc drive 530 for reading from or writing to removable optical disc 531 such as a CD-ROM or other optical media. Optical disc drive 530 is one example of an optical media recorder. The magnetic hard disk drive 527, magnetic disk drive 528, and optical disc drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disc 531, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 539, magnetic disk 529, optical disc 531, ROM 524 or RAM 525, including an operating system 535, one or more application programs 536, other program modules 537, and program data 538. A client may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

Accordingly, the present invention may be practiced in a computer that is connected to an optical media recorder over a computer network. In some new systems, system bus 523 is encapsulated and sent across a new transport, such as a TCP/IP network. For example, ISCSI (Internet SCSI or Internet Small Computer Systems Interface) is one fairly well-known implementation of a TCP/IP-based protocol for establishing and managing connections between IP-based storage devices, hosts, and clients.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. In a computer system comprising an optical media recording device with an internal buffer, a method of preventing data underruns within the internal buffer while improving a recording rate by dynamically determining a time period to delay transferring data from the computer system to the optical media recording device when the internal buffer is unable to hold additional data, the method comprising acts of:

receiving an indication to delay data transfer from the computer system to the optical media recording device because the internal buffer is unable to hold additional data;

receiving data transfer rate information for determining a data transfer rate of the optical media recording device;

receiving size information for determining a total capacity of the internal buffer;

setting the time delay period to be less than a total time to empty the internal buffer given the total capacity of the internal buffer and the data transfer rate of the optical media recording device; and sending data from the computer system to the optical media recording device immediately following the time delay period.

2. The method of claim 1, wherein there are no interim attempts at sending data prior to the expiration of the time delay period.

3. The method of claim 1, wherein the data transfer rate of the optical media recording device varies over time.

4. The method of claim 1, wherein the indication to delay data transfer from the computer system to the optical media recording device is due to insufficient space in the optical media recording device's internal buffer.

5. The method of claim 1, wherein the time delay period is no larger than a time period required to empty one-third of the total capacity of the internal buffer.

6. The method of claim 1, further comprising the act of:

receiving single write size information for determining a size of a single write to the optical media recording device.

7. The method of claim 6, wherein the time delay period is a time period required to write the determined single write.

8. The method of claim 6, wherein the size of the single write is a default value of 64 k bites.

9. In a computer system comprising an optical media recording device with an internal buffer, a method of preventing data underruns within the internal buffer while improving a recording rate by waiting a dynamically selected time period to delay data transfer from the computer system to the optical media recording device when the internal buffer is unable to receive additional data, the method comprising steps for:

temporarily stopping data transfer from the computer system to the optical media recording device because the internal buffer is unable to receive additional data;

determining a data transfer rate of the optical media recording device;

determining a capacity of the internal buffer;

waiting a time delay period dynamically selected to be less than a total time to empty the internal buffer based on the capacity of the internal buffer and the data transfer rate of the optical media recording device; and resuming data transfer from the computer system to the optical media recording device prior to the total time to empty the internal buffer.

10. The method of claim 9, wherein the data transfer rate of the optical media recording device is constant.

11. The method of claim 9, wherein the step for temporarily stopping data transfer includes the act of:

receiving an indication to delay, wherein the indication to delay data transfer from the computer system to the optical media recording device is due to a returned sense code.

12. The method of claim 11, wherein the returned sense code indicates that the optical media recording device is not ready to receive data because an operation is in process.

13. The method of claim 11, wherein the returned sense code indicates that the optical media recording device is not ready to receive data because a long write is in process.

14. The method of claim 9, wherein the step for temporarily stopping data transfer includes the act of:

receiving an indication to delay, wherein the indication to delay data transfer from the computer system to the optical media recording device is due to insufficient space in the optical media recording device's internal buffer.

15. The method of claim 9, wherein the time delay period is no larger than a time period required to empty one-third of the total capacity of the internal buffer.

16. The method of claim 9, wherein the step of waiting a time delay period comprises the act of:

receiving single write size information for determining a size of a single write to the optical media recording device.

17. The method of claim 16, wherein the time delay period is calculated such that the optical media driver is ready to receive more than a single write size.

18. The method of claim 16, wherein the time delay period is the greater of a time period required to write two single write sizes or a time period required to write one-third the total capacity of the internal buffer.

19. In a computer system comprising an optical media recording device with an internal buffer, a computer program product comprising one or more computer readable media carrying computer executable instructions that implement a method of preventing data underruns within the internal buffer while optimizing a recording rate by dynamically determining a time period to delay transferring data from the computer system to the optical media recording device when the internal buffer is unable to hold additional data, the method comprising acts of:

receiving an indication to delay data transfer from the computer system to the optical media recording device because the internal buffer is unable to hold additional data;

receiving data transfer rate information for determining a data transfer rate of the optical media recording device;

receiving size information for determining a total capacity of the internal buffer;

setting the time delay period to be less than a total time to empty the internal buffer given the total capacity of the internal buffer and the data transfer rate of the optical media recording device; and sending data from the computer system to the optical media recording device immediately following the time delay period.

20. The computer program product of claim 19, wherein there are no interim attempts at sending data prior to the expiration of the time delay period.

21. The computer program product of claim 19, further comprising the act of:

receiving available buffer size information for estimating a free internal write buffer size of the optical media recoding device's internal buffer.

22. The computer program product of claim 19, wherein the indication to delay data transfer from the computer system to the optical media recording device is due to a returned sense code.

23. The computer program product of claim 22, wherein the returned sense code indicates that the optical media recording device is not ready to receive data because an operation is in process.

24. The computer program product of claim 22, wherein the returned sense code indicates that the optical media recording device is not ready to receive data because a long write is in process.

25. The computer program product of claim 19, further comprising the act of:
receiving single write size information for determining a size of a single write to the optical media recording device.

26. The computer program product of claim 25, wherein the time delay period is calculated such that the optical media driver is ready to receive more than a single write.

27. The computer program product of claim 25, wherein the time delay period is the greater of a time period required to write two single write sizes or a time period required to write one-third the total capacity of the internal buffer.

28. In a computer system comprising an optical media recording device with an internal buffer, a computer program product comprising one or more computer readable media carrying computer executable instructions that implement a method of preventing data underruns within the internal buffer while optimizing a recording rate by waiting a dynamically selected time period to delay data transfer from the computer system to the optical media recording device when the internal buffer is unable to receive additional data, the method comprising steps for:
temporarily stopping data transfer from the computer system to the optical media recording device because the internal buffer is unable to receive additional data;
determining a data transfer rate of the optical media recording device;
determining a capacity of the internal buffer;
waiting a time delay period dynamically selected to be less than a total time to empty the internal buffer based on the capacity of the internal buffer and the data transfer rate of the optical media recording device; and
resuming data transfer from the computer system to the optical media recording device prior to the total time to empty the internal buffer.

29. The computer program product of claim 28, wherein the data transfer rate of the optical media recording device varies over time.

30. The computer program product of claim 28, wherein the step for temporarily stopping data transfer includes the act of:
receiving an indication to delay, wherein the indication to delay data transfer from the computer system to the optical media recording device is due to insufficient space in the optical media recording device's internal buffer.

31. The computer program product of claim 28, wherein the step of waiting a time delay period comprises the act of:
receiving single write size information for determining a size of a single write to the optical media recording device's internal buffer.

32. The computer program product of claim 31, wherein the time delay period is a time period required to write the determined single write.

* * * * *